Dec. 24, 1957   F. J. HARTWIG   2,817,695
ELECTRIC FURNACE AND ELECTRODE STRUCTURES FOR KAOLIN MELTING
Filed Nov. 21, 1955   3 Sheets-Sheet 1

INVENTOR.
FREDERICK J. HARTWIG
BY
*[signature]*
ATTORNEY

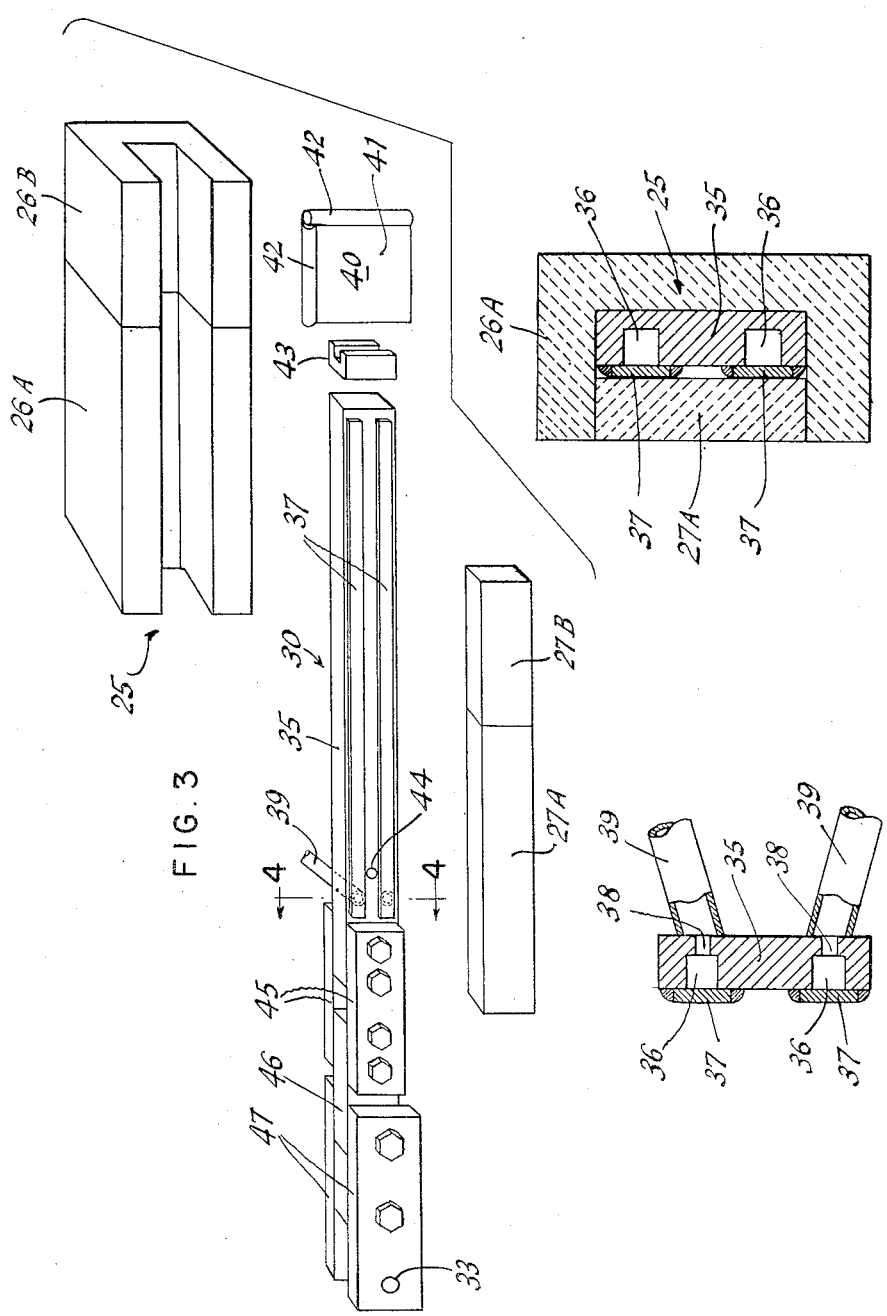

Dec. 24, 1957     F. J. HARTWIG     2,817,695
ELECTRIC FURNACE AND ELECTRODE STRUCTURES FOR KAOLIN MELTING
Filed Nov. 21, 1955     3 Sheets-Sheet 3
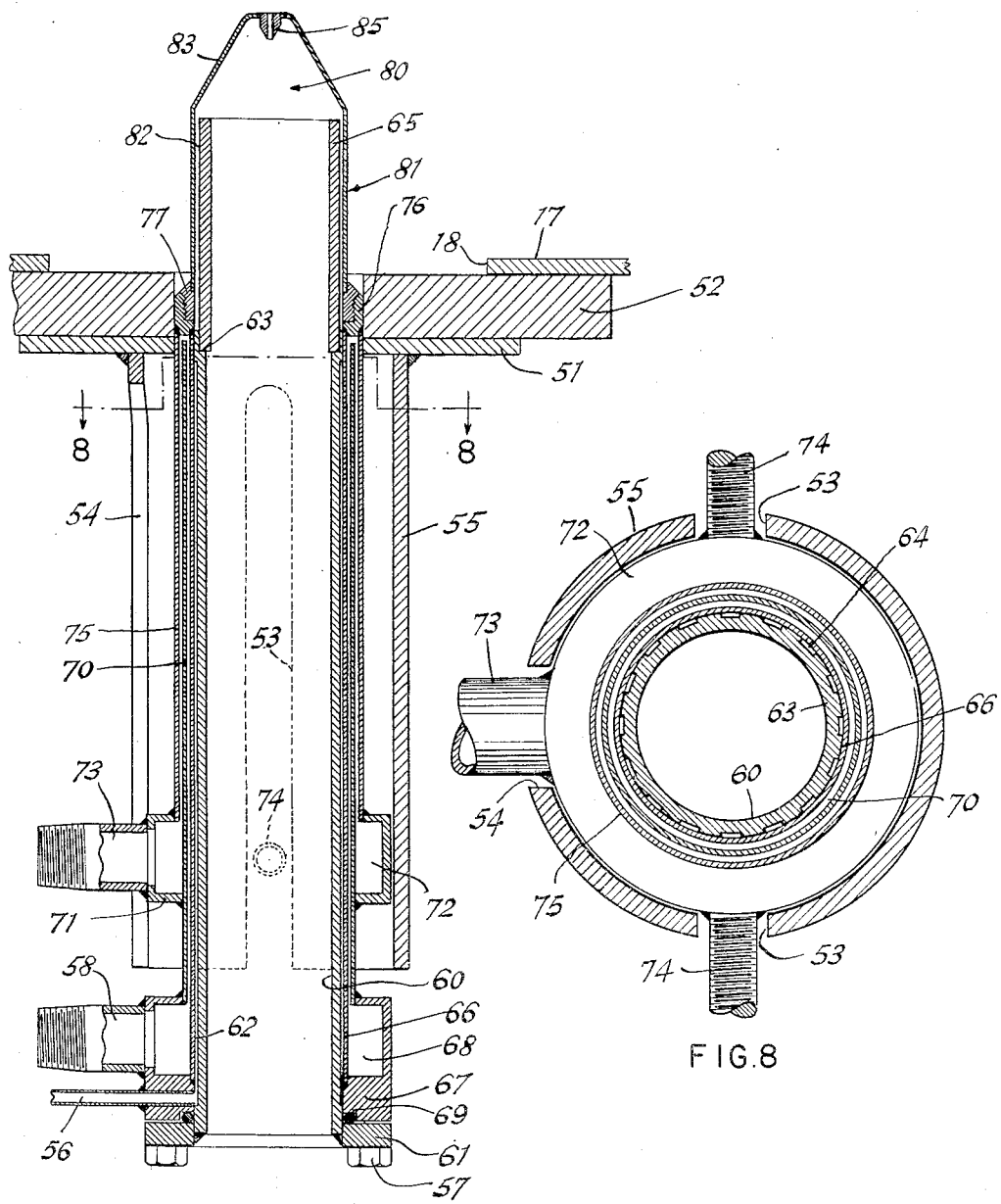
FIG.7
FIG.8
INVENTOR
FREDERICK J. HARTWIG
BY
ATTORNEY

United States Patent Office 2,817,695
Patented Dec. 24, 1957

2,817,695

ELECTRIC FURNACE AND ELECTRODE STRUCTURES FOR KAOLIN MELTING

Frederick J. Hartwig, Alliance, Ohio, assignor to The Babcock & Wilcox Company, New York, N. Y., a corporation of New Jersey Application November 21, 1955, Serial No. 547,917

16 Claims. (Cl. 13—33)

This invention relates to electric resistance furnaces for melting refractory mineral materials and, more particularly, to an improved furnace construction adapted for substantially continuous tapping of the molten refractory mineral therefrom.

The melting of such refractory mineral materials is a prerequisite for forming mineral wool. The minerals commonly employed for the manufacture of mineral wool are natural "wool rock" (calcareous shale or argilaceous limestone), common shale, and combinations of calcareous and siliceous materials, such as metallurgical furnace slag. All such materials have a fusion point in the range of 1500–2500° F.

One of the principal uses of mineral wool of the character described is for heat insulation. The upper use temperature limit for such material is determined by the temperature at which recrystallization occurs therein to an extent that embrittlement and loss of strength in the fibers result. At this temperature, known as the "devitrification" temperature, the material changes from a glassy to a crystalline structure. Tests of the best known commercial brands of mineral wool have shown none in satisfactory condition after a twenty-four hour exposure at 1350° F. due to excessive recrystallization at that temperature. The manufacturers' recommended upper use temperature limits for these mineral wools are therefore in the range of 900–1200° F.

As disclosed in Patent No. 2,467,889, a mineral wool having an upper use temperature limit in the range of 1500–2300° F. can be formed by using kaolin as a starting material. Kaolins have a fusion point of about 3245° F. The mineral wool is formed by melting the kaolin, which may be initially in the form of pieces of grog or clinker made from calcining the raw material to eliminate the water. The molten material is withdrawn from the furnace as a stream or a series of droplets and subjected to a high velocity jet of air or steam which blows the droplets into long fibers.

In the production of mineral wool from molten refractory materials, it is desirable to tap the furnace continuously, rather than to tap intermittently, as in "batch" melting. This is particularly true in the case of high melting point refractory materials, such as kaolin, as the periodic shutting down of the furnace heating in order to pour batches of the molten material results in solidification of the charge in which the electrodes or other heating elements may be imbedded. In turn, this introduces operating difficulties in re-starting the furnace.

In addition, it is difficult, if not impossible to pour the molten material at a precise location when pouring by tilting the furnace, as well as being very difficult to precisely control the pour rate. All these criteria dictate the need for a type of furnace construction in which the refractory material, such as kaolin, can be continuously and progressively melted and tapped at a uniform rate over as long a period of time as possible.

In accordance with the present invention, the kaolin, or other refractory material to be used to form a mineral wool, is melted in an electric resistance melting furnace. This furnace comprises a generally cylindrical metal shell having a metal bottom and an open top, the interior of the shell being lined with refractory brick for at least part of the distance from its bottom plate toward its open top. Three main electrodes are mounted for radial movement through the walls of the furnace, and are connected to a three-phase supply of alternating current of the required capacity. The bottom plate has a central opening beneath which is a guiding sleeve mounting a tapping nozzle which is arranged to be pushed up into the furnace.

For a better understanding of the conditions affecting design of the furnace, one method of initiating operation of the furnace will be described in some detail, with it being understood that such described starting procedure is exemplary only and that other starting procedures may be used with the invention furnace construction.

The furnace is filled with a supply of the calcined kaolin to a depth covering the main electrodes. These electrodes are then pushed inwardly until they touch at the axis of the furnace, the current is turned on, and the electrodes are pulled outwardly so that the current flows through the refractory kaolin. Due to the resistance of the kaolin, sufficient heat is developed by the electric current to melt part of the kaolin forming a pool or body of molten kaolin which gradually enlarges toward the walls of the furnace. The main electrodes are withdrawn in a predetermined manner and, when the molten pool has attained a pre-set size, dependent on the furnace dimensions, the main electrodes are quickly pushed in to bring the inner end of water-cooled support portions thereof inside the molten pool so that melt will freeze thereon and form a seal against air.

After the furnace has been started the re-entrant tapping nozzle assembly is pushed up through the mass of unmelted kaolin on the bottom furnace wall and into the pool of molten kaolin so that the latter will flow through the tapping nozzle. For best results in forming the mineral wool, it is necessary that the tap rate of the melt be controlled and maintained at an optimum value. This requires accurate temperature control of the melt at the tapping point to assure the optimum fluidity of the tapped melt. Preferably this accurate temperature control is provided by overcooling the tapping nozzle and supplying heat to the nozzle in accordance with temperature measurement of the tapped melt to maintain the melt at the tapping nozzle at the optimum temperature for tapping. One way of supplying this heat increment to the tapping nozzle is to apply a controlled potential between the tapping nozzle and a selected one of the main electrodes to effect resistance heating of the melt right at the tapping nozzle.

The molten kaolin or other refractory mineral material flows from the tapping nozzle as a continuous stream or as molten drops and is blown to fibrous form by means of steam or air jets directed against the stream of molten kaolin. A "hydrostatic" head of kaolin is provided by continuously feeding more calcined kaolin from an overhead hopper into the open top of the furnace.

After a production run of a given duration, the time length of which is variable from several hours to several days or weeks, it is generally necessary to shut down the furnace for inspection, maintenance or repair. When the furnace is thus shut down, the molten kaolin solidifies into a solid mass of refractory including the solidified kaolin and the lining of the furnace. It is necessary to disassemble the furnace in order to recover usable portions of the electrodes and tapping assembly.

Various factors must be considered in the design of the electrodes. The refractory charge, which has a high electrical resistance, is melted by current flow therethrough between the electrode tips. As the furnace charge becomes molten, it forms a large central pool of molten refractory having a current carrying cross-sectional area substantially larger than the practically feasible total current flow area of the electrode tips or portions carrying current into such pool. The overall size of such tips is, in turn, dictated by such considerations as the necessity of keeping the current density in the melt at the surfaces of the electrodes sufficiently low to prevent loss of electrode material, and the necessity of keeping the tips totally submerged in the molten pool. Otherwise, portions of the tips not thus protected from oxidation would burn away. As a result of the foregoing, the electrode tips, due to the higher current density in the contacting melt, are at a temperature higher than that of the main body of the molten material.

Loss of electrode tip material can be substantially reduced by using electrically conductive materials having a high melting point such as, for example, tungsten and molybdenum. Tungsten and molybdenum tips operate satisfactorily and their cost is such as to make these materials economically feasible.

Not all of the electrode can be submerged in the pool of molten material, and hence the electrode portions not so submerged would be subject to oxidation due to the high operating temperature of the furnace. Oxidation of the non-submerged portions of the electrodes can be prevented by maintaining such portions at a temperature below the oxidation temperature.

In view of the foregoing consideration, the present invention provides a composite electrode structure involving a tip of high melting point, electrically conductive metal, such as tungsten, molybdenum, or tantalum by way of example, welded to the inner end of a supporting structure maintained at a relatively low temperature by circulation of coolant therethrough, such supporting structure serving to conduct the current to the electrode tip and not being completely submerged in the molten refractory.

When the furnace is shut down with the electrode tips embedded in the solidified charge, the latter is split to expose the supporting portion of the electrode which then may be cut away from the tip. The relatively complex supporting structure with its special provisions for coolant circulation can thus be saved and re-used by welding a new tip thereto, and only the old tip may be lost. Thus, the overall electrode expense is substantially reduced.

The factors influencing design of the main electrodes also influence the design of the tapping nozzle assembly. This assembly, as stated, is pushed up into the pool of molten material after the furnace has been started. The top portion of the assembly is thus immersed in the liquid melt and protected thereby from oxidation. This top portion includes the nozzle per se and an inner sleeve of refractory material such as alundum, the nozzle being formed of tungsten, molybdenum, tantalum, or other high melting point electrically conductive material. The nozzle and the inner sleeve are mounted on a liquid-cooled supporting structure involving concentric sleeves between which the coolant is circulated. Inside the coolant sleeve arrangement is another sleeve forming the inner wall of a passage for the circulation of an inert gas into the nozzle to further protect the latter against oxidation and to exclude air. The entire assembly, with its coolant and inert gas connections, is slidably mounted in a slotted guide sleeve projecting coaxially downward from the furnace bottom plate.

The coolant circulation maintains the nozzle supporting structure at a temperature low enough to inhibit oxidation thereof. This structure also acts as a current conductor for the nozzle so that heating current flows into the melt from the nozzle to maintain the pool of molten charge surrounding the nozzle.

In accordance with the invention, the tapping nozzle is in the form of a cone of drawn tungsten on the upper end of a drawn tungsten cylinder integral with the cone. The apex of the cone is flattened and centrally apertured to receive a forged tungsten nozzle insert. This shape of nozzle directs the molten material axially of the re-entry tube and in spaced relation to the inner surface thereof.

The narrow end of the tapping nozzle results in a high current concentration at the conical tip of the nozzle. In turn, this results in a high current density in the melt in contact with the tip with consequent higher heating of the melt at the tip or tapping point.

It is desirable for the main electrode tips to have as large an area as possible as the current carrying cross-sectional area of the tips is necessarily substantially smaller than the corresponding area of the molten charge. This means that, for a given effective total current through the melt, the current concentration in the melt at the surface of the electrode tips is much higher than that in the main body of the melt, with corresponding high heating of the melt near the electrodes which, in turn, causes high heating of the electrode tips.

However, when the furnace is shut down for any reason, the melt solidifies into a solid mass of refractory. As the electrodes cannot be withdrawn completely from the furnace for various practical reasons, the tips remain in this solidified mass, becoming embedded therein. To save the water-cooled support structures for re-use, the embedded tips are severed from the support structures at their junction therewith, and it is generally not possible to remove the tips from the refractory mass without damage to the tips.

Consequently, the cost of replacing the tips becomes an important factor to be considered in designing the tips, particularly where a relatively expensive and difficult to work material like tungsten is involved. Thus, the economics of tip replacement cost dictate, to some extent, the practical size of the tips, considering also the operating temperature of the tips. These factors indicate a flat plate type of tip as being most practical because of the large ratio of surface area to weight of the tungsten.

It has been found, however, that use of a flat plate electrode tip results in very high current densities at the plate edges, with consequent loss of tip material. In accordance with the present invention, this condition is eliminated by welding cylindrical rods of tungsten to the edges of the tungsten plate. These rods have a diameter substantially in excess of the plate thickness, and effect such a uniform distribution of the current leaving the tip that loss of tip material due to excessive current densities is eliminated.

For an understanding of the invention principle, reference is made to the following description to a typical embodiment thereof as illustrated in the accompanying drawing. In the drawing:

Fig. 3 is an exploded perspective view of a main electrode;

Fig. 4 is a transverse sectional view of the main electrode on the line 4—4 of Fig. 3;

Fig. 5 is a transverse sectional view of the electrode and its support in the refractory lining of the furnace;

Fig. 7 is an axial sectional view of the tapping nozzle assembly; and

Fig. 8 is a diametric sectional view of such assembly on the line 8—8 of Fig. 7.

Figure 6:
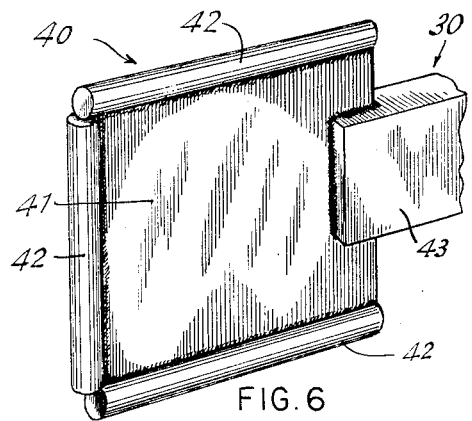
Fig. 6 is a perspective view of a main electrode tip embodying the invention.
Figure 2:
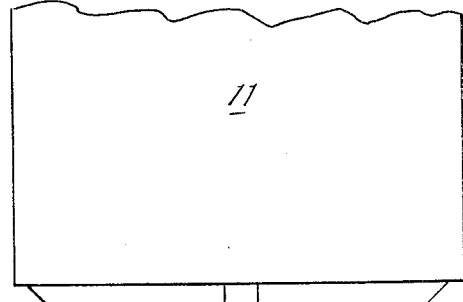
Fig. 2 is a diametric sectional view of the furnace.
Figure 1:
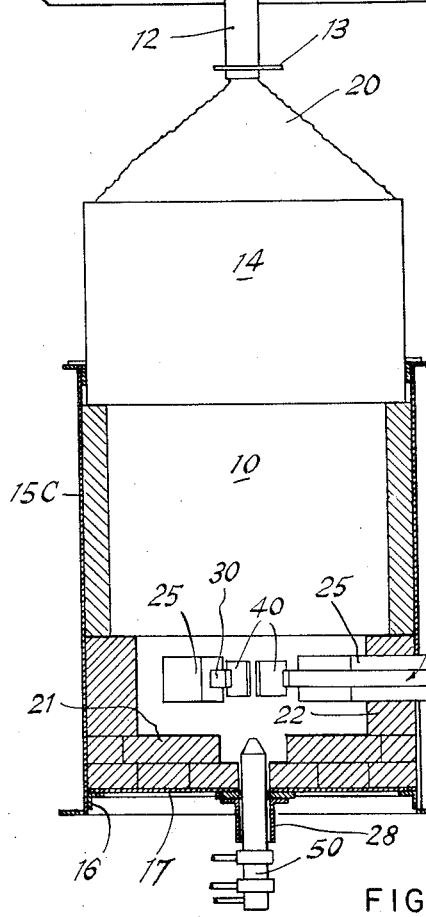
Fig. 1 is a vertical or axial sectional view of a furnace embodying the invention.

Referring to Figs. 1 and 2, the electric resistance melting furnace 10 comprises a generally cylindrical and upright metal casing 15 comprising three cylindrical segments 15A, 15B and 15C detachably interconnected at their adjacent upright edges to leave longitudinal slots therebetween to receive the main electrodes 30. Casing 15 has an angle 16 welded to its inner surface adjacent its bottom edge, this angle comprising separate arcuate angles on each of the three cylindrical segments. Angle 16 serves as a shelf to support a flat annular metal bottom plate 17 of the furnace, plate 17 having a central circular opening 18 therein. It will be noted that the furnace casing is thus an easily assembled and disassembled composite structure of the casing segments and the bottom plate.

The interior of the metal casing is lined by built-up refractory shapes providing a relatively thick refractory lining 21 on bottom plate 17 and a relatively thick wall lining 22 to a zone above the main electrodes 30.

The kaolin, or other refractory mineral material, is supplied to furnace 10 from an elevated hopper 11 having a discharge spout 12 controlled by a valve 13. Material from hopper 11 falls through spout 12 into furnace 10, and builds up through and above a cylindrical metal extension 14 removably supported on the upper end of furnace 10. The refractory charge 20 is preferably kept heaped above the upper end of extension 14 to provide a substantial "head" for the furnace charge.

The main electrodes 30 are mounted through special shape refractory brick guides 25 slidably aligned through each of the three slots in casing 15, the electrodes 30 being adjusted radially of furnace 10 by levers 31 cooperable with abutments 32. Tapping nozzle assembly 50 is mounted for axial movement through the bottom furnace opening by virtue of a guide sleeve 28 secured to plate 17 coaxially with hole 18.

Referring to Figs. 3, 4 and 5, each main electrode 30 comprises an elongated steel supporting bar or electrode body 35 having an electrode tip 40, of tungsten or other suitable high melting point metal, secured to its inner end. Bar 35 is substantially fully encased in the refractory brick guide or cover 25 which comprises channel shape bricks 26A, 26B cemented in end-to-end relation and closed by flat bricks 27A, 27B cemented in place.

To provide for coolant circulation therethrough, bar 35 is formed with a pair of laterally spaced channels 36 extending through the major part of the length of one face, channels 36 being closed by metal bars or strips 37 aligned therewith and welded to the face of the bar. Across passage (not illustrated) interconnects passages 36 near the inner end of the bar, and openings 38 connect the passages 36 to coolant inlet and outlet connections 39. Liquid coolant, such as water, flows through the coolant circuit comprising channels 36, passages 38, and connections 39 to maintain bar 35 cooled below its oxidation temperature.

The outer end of bar 35 has straps 45 of reinforced dielectric material rigidly bolted thereto and to bar 46 bolted to metal yoke 47. The latter carries a pin 33 pivotally connecting lever 31 to yoke 47. As stated, lever 31 has its lower end operating against a fixed abutment 32 to effect radial adjustment of electrode 30.

An electrical cable 48 is secured to body 35 to conduct current for electrode tip 40.

Tip 40 is formed of high melting point electrically conductive material, such as tungsten, and is not water-cooled as it is desired that the temperature of tip 40 be of the order of that of the molten material in which it is completely submerged. If the tip were cooled, the molten material would freeze or solidify thereon.

The electrode tip comprises a plate 41 of such material, which has its outer edge welded into a steel channel seat 43 in turn welded to the inner end of water-cooled support body 35. When the furnace is shut down, and the tip becomes embedded in the solidified refractory material, seat 43 is cut from the end of body 35 so that the latter may be withdrawn and re-used with a new tip assembly.

In accordance with the present invention, high current densities at the edges of plate 41 are prevented by welding rods 42 along the outer edges of the plate. These rods, which are the same materials as the plate 41, have a diameter substantially larger than the thickness of the plate. No rod 42 is necessary at the inner edge of plate 41 due to the proximity of the water-cooled support structure. The melt near the water cooling is solidified for a short distance from the support structure, which increases its electrical resistance so much that there is substantially no current flow therethrough.

The ideal current distribution would be effected with a spherical tip electrode, but such a shape is not generally economically feasible or practical, particularly when using a material such as tungsten or molybdenum for the tip. The large diameter rods 42, however, effect a current distribution which completely eliminates the high current concentrations at the edges of plate 41, with its attendant deleterious effects.

Referring to Figs. 7 and 8, the re-entrant tapping nozzle assembly 50 is slidaby mounted, for movement axially of the furnace, in a slotted guide sleeve 55 welded to an annular metal plate 51 secured to an annular plate 52, of dielectric material, in turn secured to bottom plate 17 concentrically of hole 18 in the latter. For a purpose to be described, sleeve 55 has a pair of diametrically opposite relatively narrow longitudinal slots 53 therein, between which is a relatively wider longitudinal slot 54.

Tap assembly 50 includes a relatively heavy steel support tube 60, which may be cut from 2" standard pipe, having a relatively thick connection or clamping flange 61 welded to its lower end and formed with bolt holes. From a point just above flange 61 to a point just short of the upper end of tube 60, metal is removed from the tube outer wall to form an axially elongated shallow circumferential recess 62. The inner periphery of the upper end of tube 60 is internally enlarged, by drilling or machining to form a seat 63 for a guide sleeve 65 of alumina or similar refractory material. Shallow, longitudinal slots 64 are cut in the outer periphery of the upper end of tube 60 for a purpose to be described.

Recess 62 and slots 64 are enclosed by an inner water cooling tube 66 having its lower end welded into a seat on the upper inner edge of the lower thickened wall 67 of an inwardly facing channeled annulus 68 having a coolant connection nipple 58. Wall 67 is radially apertured to sealingly receive a helium supply tube 56 communicating with recess 62. Bolts 57, inserted through the apertures in flange 61 and threaded into annulus 68, connect flange 61 to the annulus compressing an annular packing ring 69 therebetween.

A middle water or coolant tube 70 is welded to the inner edge of the upper wall of annulus 68 and extends in concentric spaced relation to tube 66, its upper end terminating somewhat short of the upper end of inner tube 66. The inner edge of the lower wall 71 of an upper inwardly facing channel annulus 72 is welded to middle tube 70 somewhat above the bottom edge of this tube. A nipple 73 is connected into annulus 72 and radially aligned with nipple 58 to extend through slot 54 in sleeve 55. Studs 74, threaded into and welded to annulus 72, extend through slots 53 in sleeve 55.

An outer water or coolant tube 75 has its lower end welded to the inner edge of the upper wall of annulus 72 and extends upwardly in coaxial spaced relation to middle tube 70. The upper ends of inner and outer tubes 66 and 75 are secured, in radially spaced relation, to seats in the inner and outer lower edges of an angular spacer ring 76 internally threaded to receive a nozzle support ring 77 having a seat receiving a re-entry tube 81 forming part of the tapping nozzle assembly 80.

Nozzle assembly 80 comprise a cylindrical part 81 seated in ring 77 and a nozzle proper 85 integral with part 81. Nozzle 85 and part 81 are formed of drawn tungsten, although they may be formed of molybdenum. As illustrated, the lower end of nozzle 85 is an inverted truncated cone, or a cone having a flattened apex and formed with an axial opening.

Prior to starting the furnace, coolant flow is initiated in main electrode body 35 and tap assembly 50. In electrode body 35, the coolant flows in the circuit previously described. Coolant for tap assembly 50 enters through nipple 58 into annulus 68, flows upwardly between tubes 62 and 70, over the top of tube 70, downwardly between tubes 70 and 75, into annulus 72, and out through nipple 73. Helium is supplied to tube 56 and flows into groove 62, through slots 64 between sleeve 65 and tube 81, and down inside tube 65 and support tube 60. The helium flow rate and pressure are maintained at such values as to maintain an effective barrier against air leaking into contact with nozzle assembly 80 which is at a very high temperature due to immersion in the pool of molten kaolin and electrical resistance heating.

The tap assembly is not pushed up into the furnace until control instruments indicate that the pool of molten kaolin has enlarged downwardly a sufficient amount to assure immersion of nozzle assembly 80 therein when the tap assembly 50 is pushed upwardly to its upper limit. For a short time before the tapping nozzle assembly 50 is moved up into the pool of molten material, helium is flushed through the nozzle assembly 80 to remove all air therefrom.

The tap assembly 50 is pushed up by means of levers which engage with the studs 74, these studs being covered with insulating sleeves to prevent grounding of the assembly when current is on. The tap assembly is pushed up as rapidly as possible until the nozzle assembly 80 is fully immersed in the pool of molten material. Molten kaolin contacting the tap assembly below nozzle assembly 80 freezes thereon to seal the nozzle assembly against oxidation. The auxiliary power for the nozzle is turned on after the tap assembly has been pushed upwardly.

After completion of a run, the power is turned off but the water cooling is left on for a sufficient time to assure that there will be no damage to any of the water cooled steel parts by excessive rusting or melting. After the furnace has completely cooled, the water and electrical connections are disconnected from electrodes 30 and tap assembly 50. Casing 15 is then disassembled from the refractory mass, and the solidified melt is split with a sledge hammer or the like. The electrode tips 40 are cut from the electrode support 35 at the junction of seating channel 43 therewith. The nozzle assembly 80 is removed from the tap assembly by unscrewing the same out of the ring 76. If this nozzle assembly is in good condition, it may be reused, but usually it is replaced by a new assembly.

It will be noted that the use of a water-cooled steel supporting means 35 or 50 with high melting point tip elements 40 or 80 permits saving the relatively expensive and complicated water-cooled support assemblies.

While a specific embodiment of the invention has been shown and described in detail to illustrate the application of the invention principle, it will be understood that the invention may be embodied otherwise without departing from such principle.

What is claimed is:

1. In an electric resistance furnace for melting refractory material, side and bottom wall means forming a container for the furnace charge; a plurality of main electrode assemblies mounted through said side wall means above said bottom wall means for movement inwardly and outwardly relative to the furnace, each main electrode assembly comprising an electrode support structure of electrically conductive oxidizable material formed with passages therein for circulation of coolant therethrough, coolant inlet and outlet connections in communication with said passages, and an electrode tip of oxidation-resistant electrically conductive material integrally secured to the inner end of said support structure; and a bottom tap assembly mounted through said bottom wall means for movement inwardly and outwardly relative to the furnace, and comprising a generally upwardly extending tubular support structure formed with passages for circulation of coolant therethrough, and a tapping nozzle unit on the upper end of said structure in the form of a substantially conical hollow tip of oxidation resistant material and having a generally central tap opening communicating with the interior of said support structure.

2. In an electric resistance furnace for melting refractory material an electrode assembly comprising, in combination, a relatively inexpensive electrode support structure of electrically conductive relatively low melting point material formed with passages therein for circulation of coolant therethrough; coolant inlet and outlet connections in communication with said passages at the outer end of said support structure; an electrode tip of high melting point electrically conductive material integrally secured to the inner end of said support structure projecting inwardly therefrom; said electrode tip being formed of material selected from the class consisting of tungsten, molybdenum, and tantalum, and said support structure being steel.

3. In an electric resistance furnace for melting refractory material an electrode assembly comprising, in combination, a relatively inexpensive electrode support structure of electrically conductive relatively low melting point material formed with passages therein for circulation of coolant therethrough; coolant inlet and outlet connections in communication with said passages at the outer end of said support structure; an electrode tip of high melting point electrically conductive material integrally secured to the inner end of said support structure projecting inwardly therefrom; said support structure comprising an elongated steel bar having coolant circulating channels extending along a surface thereof; and means covering said channels.

4. In an electric resistance furnace for melting refractory material, an electrode assembly comprising, in combination, a relatively inexpensive electrode support structure of electrically conductive relatively low melting point material including a plurality of coaxial tubular elements formed with annular passages therebetween for circulation of coolant therethrough; each passage extending between the inner surface of one element and the outer surface of the adjacent element, and the passages being in communication at the inner end of said structure; coolant inlet and outlet connections in communication with said passages at the outer end of said support structure; and an electrode tip of high melting point electrically conductive material integrally secured to the inner end of said support structure projecting inwardly therefrom.

5. An electrode assembly as claimed in claim 4 in which said connections comprise radial nipples; and a guide sleeve for said assembly having a longitudinal slot receiving said nipples.

6. In an electric resistance melting furnace for refractory material, a bottom tap assembly comprising a generally upwardly extending tubular support structure formed with passages for circulation of coolant therethrough; and a tapping nozzle unit removably connected to the upper end of said structure in the form of a substantially conical hollow member of high melting point electrically conductive material, and having a generally central tap opening communicating with the interior of said support structure.

7. A bottom tap assembly as claimed in claim 6 in which said member comprises a drawn cone of material selected from the class consisting of tungsten, molybdenum, and tantalum.

8. A bottom tap assembly as claimed in claim 6 in which said support structure is formed with passage means therethrough in communication with the interhior of said member for supplying inert gas to sweep over the inner surface of the latter.

9. A bottom tap assembly as claimed in claim 6 in which said member includes a cylindrical extension removably secured to the upper end of said support structure, and a substantially conical hollow cap member integral with the upper end of said extension.

10. A bottom tap assembly as claimed in claim 9 in which said cap member has a flattened upper end having a tapping nozzle member extending substantially centrally therethrough.

11. The method of operating an electric resistance furnace for melting refractory material including side and bottom wall means forming a container for the furnace charge, a plurality of main electrode assemblies mounted through said said wall means above said bottom wall means for movement inwardly and outwardly relative to the furnace, each main electrode assembly comprising an electrode support structure of electrically conductive oxidizable material formed with passages therein for circulation of coolant therethrough, coolant inlet and outlet connections in communication with said passages, and an electrode tip of oxidation-resistant electrically conductive material integrally secured to the inner end of said support structure; and a bottom tap assembly mounted through said bottom wall means for movement inwardly and outwardly relative to the furnace, and comprising a generally upwardly extending tubular support structure formed with passages for circulation of coolant therethrough, and a tapping nozzle unit on the upper end of said structure in the form of a substanitally conical hollow tip of oxidation resistant material and having a generally central tap opening communicating with the interior of said support structure; said method comprising charging the furnace to a depth covering the main electrode assemblies; moving the main electrode assemblies inwardly to interengage their electrode tips; establishing electric potentials between the main electrode assemblies; withdrawing the main electrode assemblies to establish current flow through the furnace charge to melt the same by resistance heating thereof to form a pool of molten refractory material; after such pool has enlarged to a pre-set volume, quickly moving the main electrode assemblies inwardly an amount sufficient to bring the inner ends of their coolant-cooled support structures within the pool for freezing of melt thereon to form a seal against air; and moving the bottom tap assembly upwardly to bring the tip into the pool for tapping of the molten refractory material through the interior of the coolant-cooled support structure of the tap assembly.

12. For use in an elcetric furnace, an electrode comprising a relatively flat plate of electrically conductive material; and a rod of electrically conductive material extending along an edge of said plate.

13. For use in an electric furnace, an electrode comprising a relatively flat plate of electrically conductive material; and a rod of electrically conductive material extending along an edge of said plate; said rod having a diameter greater than the thickness of said plate.

14. For use in an electric furnace, an electrode comprising a relatively flat substantially rectangular plate of electrically conductive material; and rods of electrically conductive material extending along at least one edge of said plate.

15. For use in an electric furnace, an electrode comprising a relatively flat substantially rectangular plate of electrically conductive material; and rods of electrically conductive material extending along adjacent edges of said plate; said rods having a diameter greater than the thickness of said plate.

16. For use in an electric furnace, an electrode comprising a relatively flat substantially rectangular plate of electrically conductive material; and rods of electrically conductive material welded along adjacent edges of said plate; said rods having a diameter greater than the thickness of said plate; said plate and rods being formed of tungsten.

References Cited in the file of this patent

UNITED STATES PATENTS

| Re. 22,479 | Dobscha | May 16, 1944 |
| 585,275 | Moore | June 29, 1897 |
| 916,548 | Gorrell | Mar. 30, 1909 |
| 1,833,739 | Davis | Nov. 24, 1931 |
| 2,467,889 | Harter et al. | Apr. 19, 1949 |
| 2,471,531 | McIntyre et al. | May 31, 1949 |
| 2,580,518 | Conti | Jan. 1, 1952 |
| 2,591,709 | Lubatti | Apr. 8, 1952 |
| 2,657,922 | Casey et al. | Nov. 3, 1953 |

FOREIGN PATENTS

| 4,075 | Great Britain | of 1898 |